United States Patent [19]

Stumpe

[11] Patent Number: 5,702,163
[45] Date of Patent: Dec. 30, 1997

[54] METHOD AND APPARATUS FOR CONTROLLING A BRAKE SYSTEM OF A VEHICLE

[75] Inventor: Werner Stumpe, Stuttgart, Germany

[73] Assignee: Robert Bosch GmbH, Stuttgart, Germany

[21] Appl. No.: 596,307

[22] PCT Filed: Aug. 19, 1995

[86] PCT No.: PCT/DE95/01097

§ 371 Date: Feb. 13, 1996

§ 102(e) Date: Feb. 13, 1996

[87] PCT Pub. No.: WO96/08397

PCT Pub. Date: Mar. 21, 1996

[30] Foreign Application Priority Data

Sep. 14, 1994 [DE] Germany .................. 44 32 642.4

[51] Int. Cl.[6] .................................................. B60T 13/00
[52] U.S. Cl. ........................................................ 303/9.62
[58] Field of Search ................... 303/9.62, 9.63, 303/22.1, 22.4, 22.5, 113.4, 113.5, 148, 186, DIG. 4; 188/181 C, 195; 364/426.01, 426.04

[56] References Cited

U.S. PATENT DOCUMENTS

| 4,560,210 | 12/1985 | Tami .................. 303/22 R |
| 4,606,586 | 8/1986 | Eckert ................. 303/93 |
| 4,677,557 | 6/1987 | Stumpe ................ 364/426 |

FOREIGN PATENT DOCUMENTS

| 149137 | of 1985 | European Pat. Off. . |
| 276435 | of 1988 | European Pat. Off. . |
| 374484 | of 1990 | European Pat. Off. . |
| 509225 | of 1992 | European Pat. Off. . |
| 621161 | of 1994 | European Pat. Off. . |
| 630788 | of 1994 | European Pat. Off. . |

Primary Examiner—Robert J. Oberleitner
Assistant Examiner—C. T. Bartz
Attorney, Agent, or Firm—Felfe & Lynch

[57] ABSTRACT

The pressure in the brake system is adjusted by an electronic control unit to conform to a nominal value, and the onset of the braking action is derived from the detection of the reaction of the vehicle body during the braking operation. The nominal value is determined based on the driver's command and the measured pressure in the brake system at the onset of braking.

10 Claims, 3 Drawing Sheets

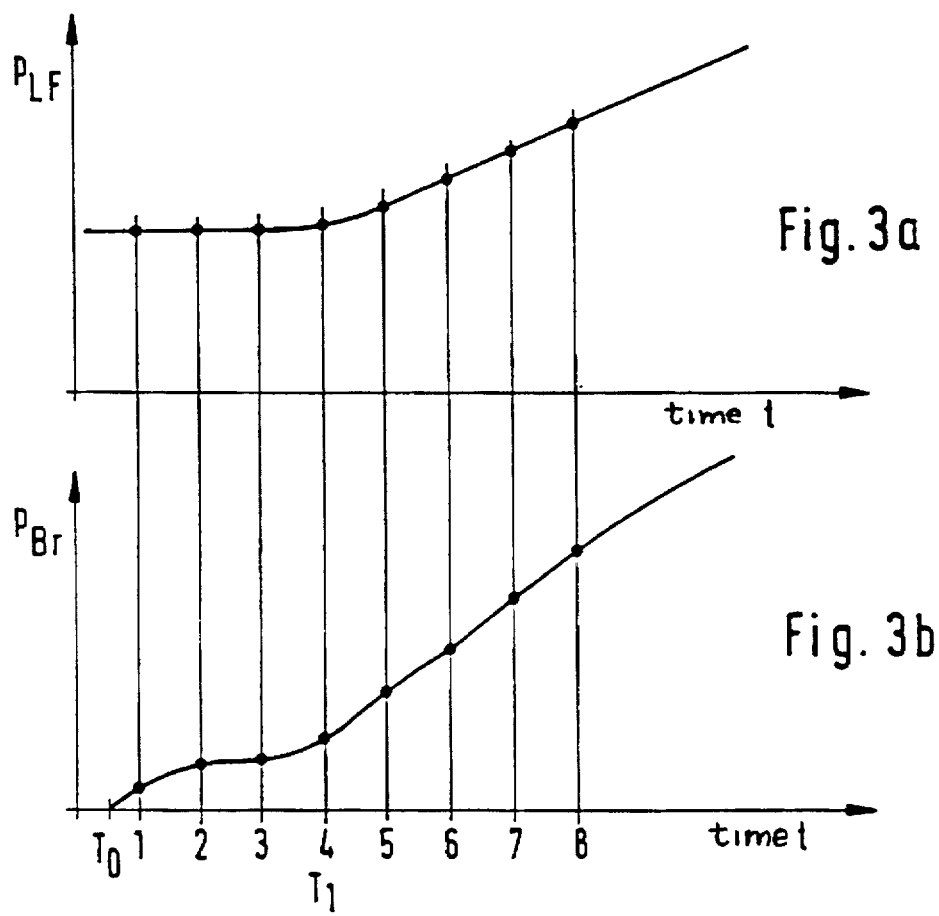
Fig. 3a
Fig. 3b
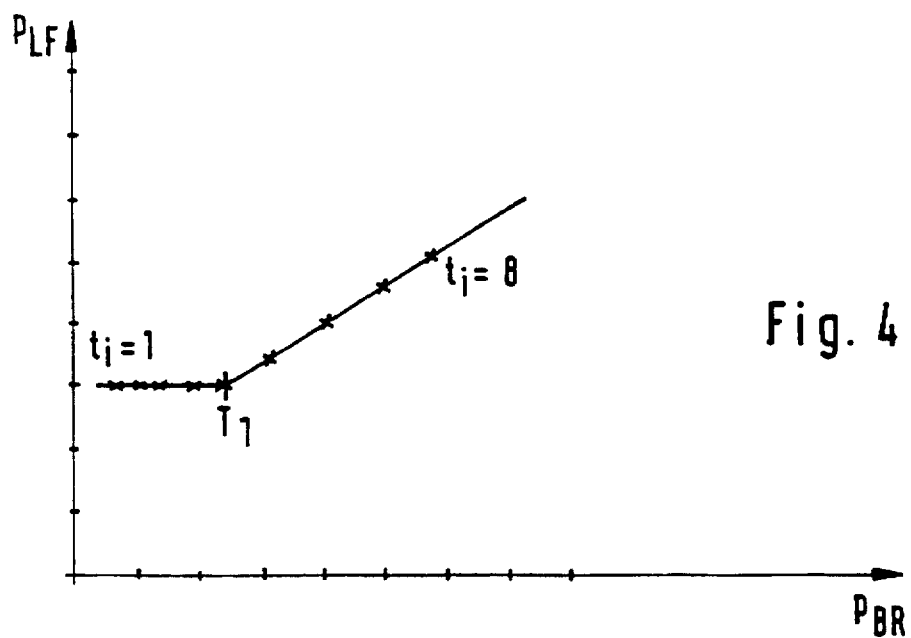
Fig. 4

METHOD AND APPARATUS FOR CONTROLLING A BRAKE SYSTEM OF A VEHICLE

STATE OF THE ART

The invention pertains to a method and an apparatus for controlling a brake system of a vehicle wherein braking action is effected as a function of the driver's command and the application pressures.

A method and apparatus of this type are known from, for example, DE 41 12 845 A1. In the electrically controlled brake system described in that document, the application pressure of the individual wheel brakes and thus the onset of braking are determined by evaluation of the change in pressure over time during a brake actuation process. This application pressure serves to correct a nominal pressure derived from the driver's command, and the corrected nominal pressure is used to control the supply of pressure medium being sent to the individual wheel brakes. The correction is carried out with the goal of producing a uniform braking force at all the wheels of the vehicle or at all the wheels of one axle of the vehicle. As a result, influences such as wear, variations in the coefficient of friction, mechanical losses, and tolerances at the individual wheel brakes are compensated. In addition, through the determination of the application pressures, the simultaneous response of the individual wheel brakes is guaranteed, so that the bumping forces between the tractor and the trailer are reduced. The braking reaction, the braking action, and the onset of the braking action are determined on the basis of parameters of the brake system itself. This can be unsatisfactory in a concrete case.

The task of the invention is to provide measures for improving the detection the of braking reaction, of the braking action, and of the onset of the braking action.

This is achieved by means of the characterizing features of the independent claims.

It is known from EP 149 137 A2 that a signal corresponding to the static axle load can be detected and that this can be used by a braking force control system to distribute the brake pressures.

EP 276 435 describes an electrically controlled brake system in which the braking moment is determined and evaluated.

SUMMARY OF THE INVENTION

According to the invention, the onset of braking action is determined from the reaction of the vehicle body during braking.

The process according to the invention makes it possible to detect the braking action and the onset of the braking action. As a result, an electrical-pneumatic or electrical-hydraulic or purely electrical brake system can be controlled more effectively.

It is especially advantageous that the values of the supporting forces or axle loads determined by means of the process according to the invention can be used to help distribute the brake pressures.

It is also of particular advantage that, on the basis of the values thus determined, the braking moments applied at the individual wheels can be calculated.

It is also advantageous that the process according to the invention makes it possible to monitor the brake system.

As a result of the process according to the invention, the brakes are synchronized with each other in such a way that the wear behavior and the bumping forces between the tractor and the trailer are significantly decreased. Defective synchronizations carried out mechanically are also corrected during the course of vehicle operation by means of the automatic synchronization of the brake system.

Additional advantages can be derived from the following description of exemplary embodiments and from the dependent claims.

BRIEF DESCRIPTION OF THE DRAWING

The invention is explained in greater detail below on the basis of the exemplary embodiments illustrated in the drawing.

FIG. 3 shows the change in the brake pressure and in the supporting forces versus time during braking;

FIG. 4 shows the correlation between the supporting forces and the brake pressure.

DESCRIPTION OF THE EXEMPLARY EMBODIMENTS

Figure 1:
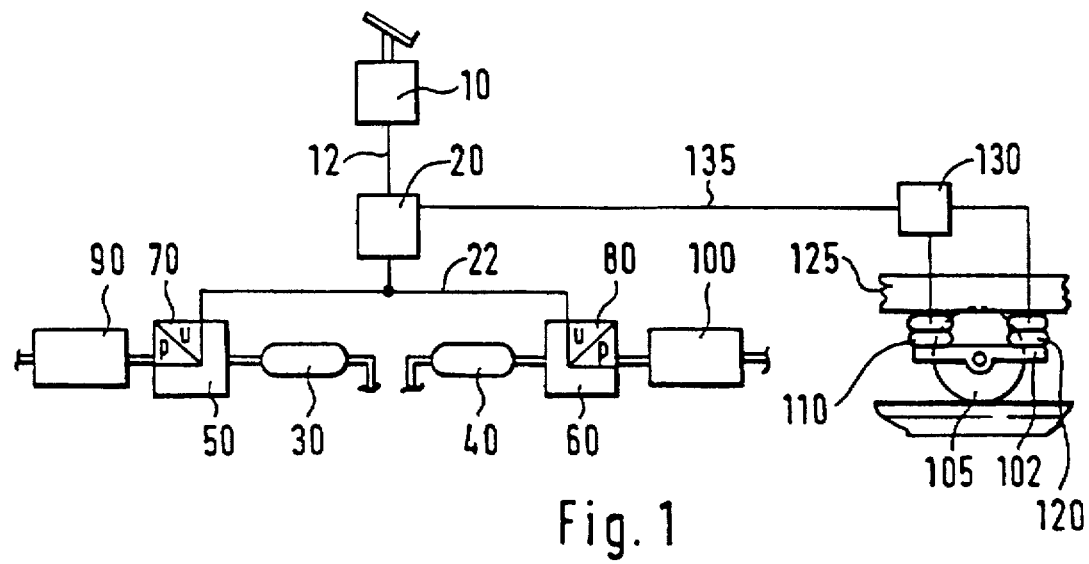
FIG. 1 shows an overall block circuit diagram of an electrically controlled brake system.

FIG. 1 shows an overall block circuit diagram of an electronically controlled brake system of the type known from the state of the art. As a rule, pneumatic or hydraulic emergency or auxiliary brake circuits are also part of such a system. FIG. 1 shows a transmitter 10, which can be actuated by the driver, and which is connected by way of an electrical line 12 to an electronic control unit 20. Electronic control unit 20 is connected by way of a communications system 22 to pressure control valves 50, 60. These control the pressure in brake actuating mechanisms 90, 100 which actuate the brakes and also have, in addition to electronic components for controlling the pressure, sensors 70, 80 for detecting the pressure actually produced in brake actuating mechanisms 90, 100. Reservoirs 30, 40 are also shown, which store the energy required for actuating the brakes. In the preferred exemplary embodiment, the illustrated pressure control valves 50, 60 are assigned to an axle and control the pressure in the brake actuating mechanisms of an axle. In other exemplary embodiments, a pressure control valve of this type is assigned to each wheel brake or to an axle/wheel brake combination. FIG. 1 also shows in schematic form an axle 102 of the vehicle with a wheel 105 and two spring elements 110, 120, on which a vehicle body 125 rests. To determine the forces supporting the vehicle body on the vehicle axle, a load detection element 130 is provided. In a preferred exemplary embodiment, this element detects the pressures in the two spring elements 110, 120. Load detection element 130 is connected by way of an electrical line 135—in the preferred exemplary embodiment, by way of communications system 22—to electronic control unit 20.

On actuation of the brake pedal by the driver, transmitter 10 sends a control signal to electronic control unit 20. The control unit assigns a nominal pressure value, corresponding to the driver's command, to the degree of actuation of transmitter 10. The nominal value is then sent by way of data bus 22 to each of the pressure control valves. The pressure is adjusted to match the nominal value by the pressure control valve as part of a closed-loop control circuit. In electronic control unit 20, a characteristic curve of the nominal pressure versus the degree of actuation of transmitter 10 is stored for each pressure control valve, that is, for each axle or for each wheel brake; this curve takes into account the individual differences between the wheel brakes. In particular, the characteristic curves are determined in such a way that the braking action begins almost simultaneously at all of the wheels. The key point here is therefore that electronic control unit 20 is able to recognize the braking reaction, the braking action, and the onset of the braking action and to correct the characteristic curves accordingly. The pressure detected by pressure sensors 70, 80 is transmitted via communications system 22 to electronic control unit 20 for evaluation. In addition to the electronically controlled braking function illustrated, an axle load-dependent pressure adjustment and a brake antilock safety system are also provided, as known in accordance with the state of the art.

To detect the braking action and the onset of the braking action in the preferred exemplary embodiment, the braking reaction in spring elements 110, 120 is evaluated by means of load detection element 130.

Figure 2A:
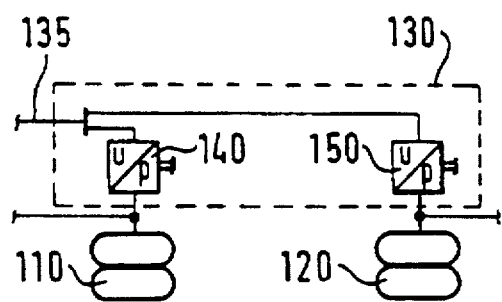
FIG. 2 shows various alternatives for detecting the supporting forces at a wheel.
Figure 2B:
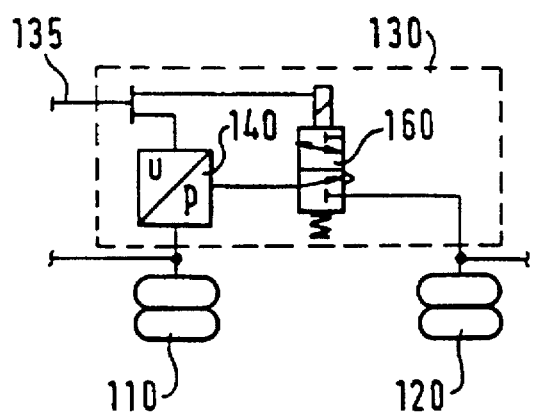
Figure 2C:
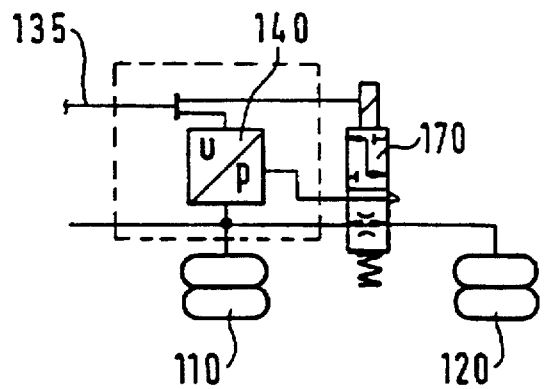

Various embodiments of this load detection element 130 are shown in FIG. 2. For example, FIG. 2a shows a load detection element 130 with two pressure sensors 140, 150, which measure the pressures in the spring elements. In another advantageous exemplary embodiment, only one pressure sensor is provided, the signal of which can be sufficient to determine the braking action and the onset of the braking action. FIG. 2b shows a load measuring element 130 with one pressure sensor 140 and a switching valve 160. The pressure sensor is connected to a spring element 110 and, through the actuation of switching valve 160, electronic control unit 20 can also send a comparison pressure from the second spring element 120 to the sensor. As a result, the pressure sensor detects both the pressure in spring element 110 and also the difference between the pressures in the two spring elements. Switching valve 160 is in this case actuated by electronic control unit 20 at predetermined measurement times. In addition, in the exemplary embodiment according to FIG. 2c, switching valve 170 is combined with the existing shutoff valve of the pneumatic spring system.

Load detection element 130 serves to detect the braking reaction by determining the supporting forces acting on at least one support point of the vehicle body. In an advantageous exemplary embodiment, furthermore, the difference in the force between individual spring elements is determined. The supporting forces are determined by measurement of the pressure in the spring elements. Control unit 20 accepts the values from load detection element 130 as input at certain time intervals and evaluates them to determine the braking reaction, the braking action, and the onset of braking as described below.

FIG. 3 shows the curves of the supporting force, i.e., of the pressure $P_{LF}$ in a spring element, and of the brake pressure $P_{Br}$ arrived at in the brake system of the corresponding wheel as a function of time. The electronic control unit determines the prevailing pressure values at given time intervals. It has been found that pressure is fed into the wheel brake cylinder only after transmitter 10 has been actuated beyond a certain point at time $T_0$. A reaction at the vehicle body, which becomes evident through a change in the pressure in the spring elements and thus in the supporting forces, does not occur until time $T_1$, because only then does a braking moment reaction, that is, a braking action, occur. When the brake pressure and the spring element pressure are compared at the various time intervals, the behavior shown in FIG. 4 is obtained. In spite of the increase in the brake pressure $P_{BR}$, the spring element pressure $P_{LF}$ remains constant for a certain period of time and then starts to increase at time $T_1$ in a manner similar to the increase in the brake pressure. Time $T_1$ thus designates the onset of the braking action on the vehicle, which makes itself evident at this point as a reaction of the vehicle body to the applied braking moment. According to the invention, this reaction of the vehicle body is evaluated to determine the braking action and the onset of the braking. If a reaction to the braking moment is found in the vehicle body (at time $T_1$), then the value of the brake pressure present at that time is stored as the onset of the braking action and evaluated within the framework of the above-described characteristic curves. In the simplest case, it is sufficient to evaluate the reaction to the braking moment on the basis of the pressure in one of the pneumatic cushion-type springs of the wheel suspension system of the vehicle. In a preferred exemplary embodiment, however, the difference between the pressures in the two pneumatic springs is used, because this approach improves the accuracy of the detection of the braking action and of the onset of the braking action. It should be pointed out that the curve of the pressure difference over time is comparable to that of FIG. 3a.

Figure 5:
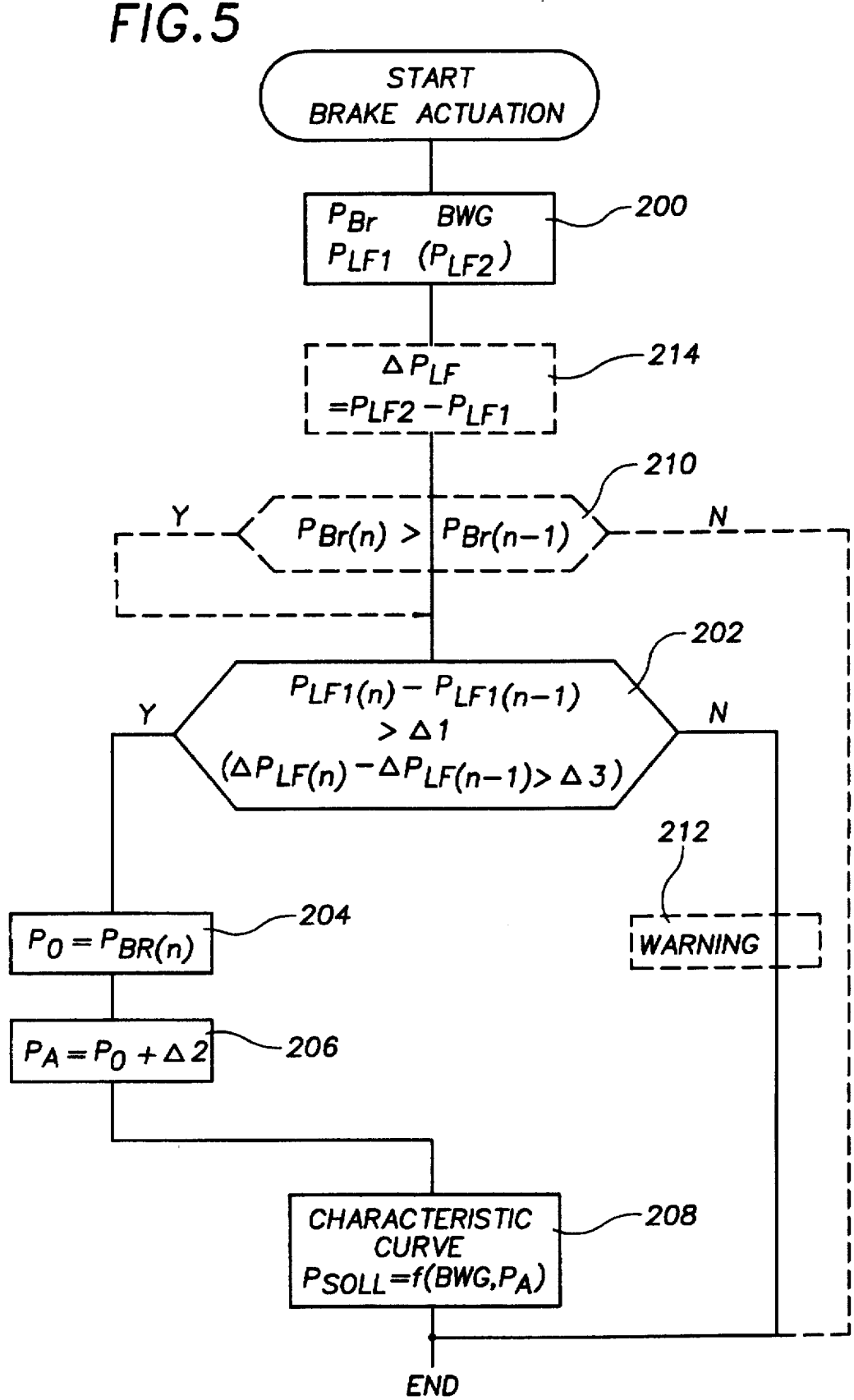
FIG. 5, finally, shows a flow chart which illustrates how the braking action and the onset of the braking action are determined according to the process of the invention.

FIG. 5 shows a flow chart, which illustrates the process according to the invention.

The subprogram starts as soon as the brake is actuated, which can be derived from the actuating signal of transmitter 10. In a first step 200, the brake pressure $P_{Br}$ in the pressure control valve 60 or 70 and the pressure $P_{LF1}$ in a first spring element 110 are accepted as input. In an advantageous additional exemplary embodiment, the pressure $P_{LF2}$ in the second spring element is also accepted as input. Thereupon, in step 202, the program checks to see whether the difference between the accepted current pressure $P_{LF2(n)}$ in the spring element and the pressure accepted as input in the preceding run of the program $P_{LF2(n-1)}$ is greater than a difference value $\Delta 1$. If this is the case, in step 204 the current measured brake pressure value $P_{Br(n)}$ is stored as pressure $P_0$, which characterizes the onset of the braking action. In subsequent step 206, the stored value $P_0$ is corrected by a tolerance value $\Delta 2$, and thus the pressure $P_A$ for the onset of the braking action is found. In the next step 208, the characteristic curve is found which determines the nominal value $P_{soll}$ on the basis of the actuation value BWG of transmitter 10 and the pressure for the onset of braking $P_A$. The subprogram ends here and is repeated when called for.

In an advantageous exemplary embodiment, not only the pressure in a spring element but also the pressure $P_{Br}$ in the brake system is evaluated to determine the braking action and the onset of the braking action. For this purpose, a step 210 is inserted between steps 200 and 202. Here the current measurement value for the brake pressure $P_{BR(n)}$ is checked to see whether it is larger than the brake pressure $P_{Br(n-1)}$ measured in the preceding run of the program. If this is the case, the program continues with step 202, but in the opposite case the subprogram ends. The inclusion of the brake pressure in the determination of the braking action and of the onset of the braking action offers the advantageous opportunity for the system to check whether the brake pressures actually produced bring about the expected braking action. If, namely, after an increase in the brake pressure has been determined in step 210, no corresponding reaction in the vehicle body is recognized in step 202 after a certain filtering time or after a given number of similar results, then it is assumed that the brake pressure produced has not in fact achieved any braking action. In this case, step 212 sends the driver an optical or acoustic warning signal. The subprogram then ends with step 212.

In another advantageous exemplary embodiment, the pressure is measured not just in one but in two spring elements, i.e., the difference between the two pressures is determined, and the difference between the pressures in the two spring elements is used to improve the accuracy of the detection of the braking action and of the onset of the braking action. For this purpose, in the exemplary embodiment shown in FIG. 5, the pressure $P_{LF2}$ in the second spring element is accepted as input in step 200. In the following step 214, the difference $\Delta P_{LF}$ between the pressure $P_{LF2}$ in the second spring element and that ($P_{LF1}$) in the first spring element is found. After the completion of step 210, which it is advantageous to insert, the program continues to step 202, where it checks the pressure difference-versus-time curve $\Delta P_{FL}$, not the pressure-versus time curve in the first spring element. For this purpose, the difference between the current measurement value of the pressure difference $\Delta P_{LF(n)}$ and the pressure difference $\Delta P_{LF(n-1)}$ measured in the preceding run of the program is compared with a predetermined difference value $\Delta 3$. If the difference exceeds this value, the subprogram continues with step 204; otherwise, the subprogram ends, possibly after completion of step 212.

In addition to the illustrated evaluation of the pressure difference or of the pressure in one spring element, it can also be provided in an advantageous exemplary embodiment that, in step 202, both of these conditions must be present as a criterion for identifying the onset of the braking action.

If the load detection element-is designed in such a way that it detects a value for the pressure difference between the two spring elements and a value for the pressure in one spring element, step 214 is omitted, and both values are accepted as input in step 200.

The computer program illustrated in FIG. 5 is carried out for each wheel brake or for each axle of the vehicle to which a pressure control valve is assigned, and the characteristic curve for the nominal pressure value is formed accordingly.

In addition to an application of the processes according to the invention in vehicles with pneumatic suspensions, it will also be applied advantageously in vehicles with leaf springs.

In a further advantageous exemplary embodiment, the determination of the braking action and of the onset of the braking action according to the process of the invention is carried out automatically on the occasion of each braking operation or, on the basis of a time criterion, for example, it is carried out on the occasion of selected braking operations as the vehicle is being driven. In other exemplary embodiments, the process according to the invention is carried out additionally or alternatively within the scope of diagnosis in the service garage. There, the individual axles or the individual wheels can also be braked in succession.

It is especially advantageous that not only the braking action and the onset of the braking action but also the braking moments actually acting on the road, i.e., the effective braking force, can also be calculated from the supporting forces measured during the braking operation. For this purpose, the following equations can be derived.

When the pressures are being measured in two spring elements, a value for the braking moment $M_B$ is obtained from the pressure difference between the two spring elements during the braking operation ($\Delta p$) and during unbraked driving ($\Delta p_0$):

$$M_B = K \times (\Delta p - \Delta p_0)$$

where the constant K is a value which characterizes the geometric relationships of the axle and of the wheel suspension of the vehicle.

If the pressure is detected in only one spring element, then the braking moment is derived from the difference in the pressure during unbraked driving $P_U$ and the pressure during braked driving $P_B$ as follow:

$$M_B = K \times (P_B - P_U)$$

where K is again a constant value derived from the geometric relationships of the axle and the wheel suspension. It is advantageous to compare the calculated values as a way of diagnosing or monitoring the brake system, i.e., to compare these calculated values with allowable limit values; a defect is recognized if the values fall above or below these limits. Then the current gradients of the braking moment or braking force can be determined from the calculated braking moment. In another exemplary embodiment, the determined braking moment is used to control a brake system according to the state of the art described above.

In summary, it can be stated that, as a result of the process according to the invention, the braking reaction of the vehicle body is determined by measuring the deflection of the spring elements. The braking reaction is measured on at least one support point, and the supporting forces or differential forces are determined. By comparison with the actual brake pressures, the pressure which brings the associated brake or brakes into action can be determined. On the basis of this pressure value, the input values are adjusted to compensate in such a way that the same effect begins at essentially the same time at all the brakes. Through the determination of the supporting forces, the advantageous possibility opens up of being able to use the values of the supporting forces to distribute the brake pressure and to control the brake pressure distribution as known in the state of the art. It is also advantageous that, through the determination of the supporting forces, it is possible to calculate the braking moments or braking forces actually in effect.

These values can be used advantageously to diagnose the braking action of the individual brakes. In addition, the process according to the invention makes it possible to monitor the brake system to determine whether the brake pressures actually produced in fact bring about the anticipated braking action. In the event that the brake is not functioning properly, a warning can be sent to the driver. By intentionally braking the individual axles in succession and by evaluating the resulting braking action on the vehicle, it is possible to find efficiently where cause and effect are located.

I claim:

1. Method for controlling a brake system of a motor vehicle having a body which reacts to a braking action, said vehicle further comprising at least one axle which is mounted to said body by spring means, and wheels having brakes on each said at least one axle, said method comprising determining a nominal value of a variable representing braking action at at least one wheel as a function of a command from the driver, controlling the braking action at said at least one wheel on the basis of said nominal value, measuring the reaction of the vehicle body to said braking action, determining the onset of braking action at said at least one wheel based on the reaction of the vehicle body to said braking action, detecting the value of said varisable when the onset of braking action is determined, and correcting said nominal value at each said at least one wheel as a function of the value of said variable when the onset of braking is determined.

2. Method as in claim 1 wherein said reaction of the vehicle body is measured by determining a supporting force of the body on the axle during said braking action.

3. Method as in claim 2 wherein said supporting force is determined by determining pressure in said spring means.

4. Method as in claim 1 further comprising determining the pressure in said spring means over time, the onset of braking action being determined by a change in said pressure over time.

5. Method as in claim 1 wherein said spring means comprises first and second spring elements, said method further comprising determining a difference between pressures of said first and second spring elements over time, said reaction of the vehicle body being measured based on said difference between brake pressures over time.

6. Method as in claim 5 wherein the onset of braking action is determined based on an increase in said difference over time.

7. Method as in claim 1 wherein said nominal value is corrected at each said at least one wheel so that the onset of braking occurs at essentially the same time at all of said brakes.

8. Method as in claim 1 wherein said spring means comprises a spring element, said reaction of the vehicle body being determined by determining pressures in said spring element during braked and unbraked travel, and determining the difference between said pressures, said method further comprising determining a braking moment at at least one wheel based on said difference, comparing said braking moment with allowable limit values, and giving a warning of a brake system defect if said braking moment is not within said allowable limit values.

9. Method as in claim 1 wherein said spring means comprises first and second spring elements, said reaction of the vehicle body being determined by determining pressures in said spring elements during braked and unbraked driving, determining a difference $\Delta p$ between said pressures during braked travel and a difference $\Delta po$ between said pressures during unbraked travel, and determining a difference ($\Delta p - \Delta po$) between said differences, said method further comprising determining a braking moment at at least one wheel based on said difference ($\Delta p - \Delta po$), comparing said braking moment with allowable limit values, and giving a warning of a brake system defect if said braking moment is not within said allowable limit values.

10. Apparatus for controlling a brake system of a motor vehicle having a body which reacts to braking action, said vehicle further comprising at least one axle which is mounted to said body by spring means, and wheels having brakes on each said at least one axle, said apparatus comprising a transmitter which transmits a signal representing the driver's command, means for determining a nominal value of a variable representing braking action at said at least one wheel, means for measuring the reaction of the vehicle body to braking action, an electronic control unit which determines onset of braking action at at least one wheel based on the reaction of said vehicle body to said braking action, and which corrects the nominal value of said variable based on said driver's command and said reaction of the vehicle body to said braking action, and control valve means which adjusts the variable to conform to said corrected nominal valve of said variable.

* * * * *

UNITED STATES PATENT AND TRADEMARK OFFICE
CERTIFICATE OF CORRECTION

PATENT NO. : 5,702,163
DATED      : December 30, 1997
INVENTOR(S) : Werner Stumpe It is certified that error appears in the above-identified patent and that said Letters Patent is hereby corrected as shown below:

In column 2, lines 6-8, delete the sentence "Additional ... claims."

Signed and Sealed this

Twenty-seventh Day of June, 2000

Attest:

Q. TODD DICKINSON

*Attesting Officer*      *Director of Patents and Trademarks*